E. Rowe,
Apparatus for Cooling the Rollers Used in the Manufacture of Isinglass.
N°. 106,212. Patented Aug. 9, 1870.

Witnesses:

Inventor:
Ebenezer Rowe
by his attorney

UNITED STATES PATENT OFFICE.

EBENEZER ROWE, OF ROCKPORT, MASSACHUSETTS.

IMPROVEMENT IN APPARATUS FOR COOLING THE ROLLERS USED IN THE MANUFACTURE OF ISINGLASS.

Specification forming part of Letters Patent No. 106,212, dated August 9, 1870.

*To all persons to whom these presents may come:*

Be it known that I, EBENEZER ROWE, of Rockport, of the county of Essex and State of Massachusetts, have invented a new and useful Apparatus for Cooling the Rollers Used in the Manufacture of Isinglass or Sheets of Ichthyocolla; and do hereby declare the same to be fully described in the following specification and represented in the accompanying drawing, making part thereof, of which—

Figure 1:
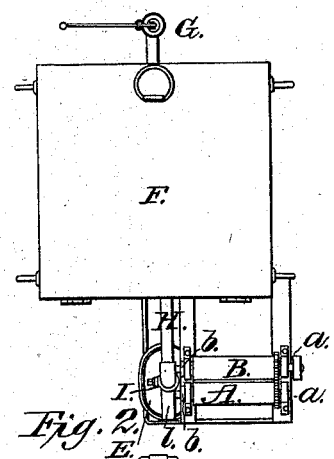
Figure 4:
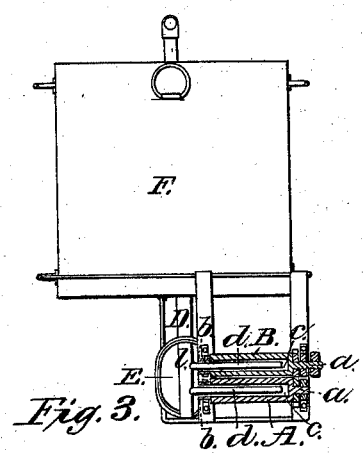
Figure 2:
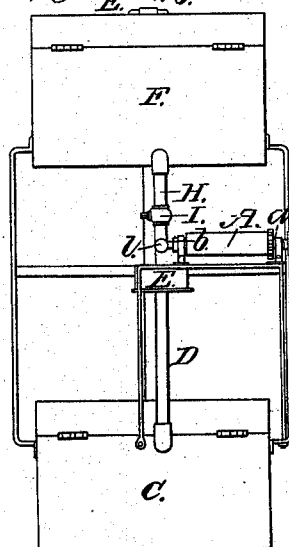
Figure 3:
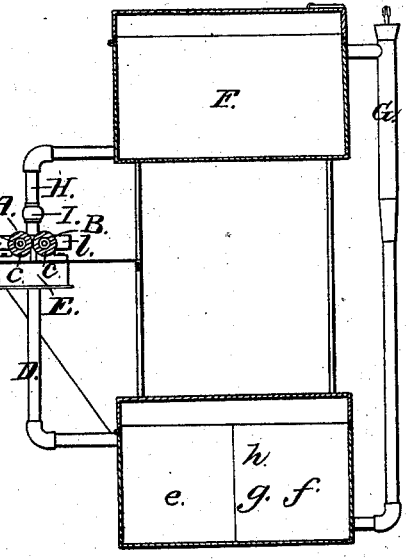

Figure 1 is a top view, Fig. 2 a side elevation, and Fig. 3 a vertical section, of such apparatus and a pair of the rollers. Fig. 4 is a horizontal section taken through the said rollers.

On December 19, 1848, Letters Patent No. 5,978 were granted to me for an improvement in machinery for the manufacture of isinglass or ichthyocolla.

In the drawing of my present invention I have shown the rollers A B as provided with the cold-water-induction tubes $d$ $d$ and the eduction-passages $c$, arranged with the journals $a$ $b$, in manner and in accordance with my patented invention, although each of the rollers may have the water let into one journal and discharged by the other.

I would observe that in the common way of refrigerating or cooling the rollers, as practiced before my present invention, the water, after escaping from them, has been allowed to run to waste, much of its effective powers for cooling being thereby lost. With my present invention I am enabled to use the same water over and over again until the ice employed for cooling it may become melted. I am thereby enabled to utilize all the cooling property of the ice, and as a consequence effect a great saving in the expense of refrigerating or cooling or keeping at the proper temperature the rollers for reducing the material to sheets.

The necessity of so cooling them is represented in the specification of my aforementioned patent, and therefore need not be herein explained.

In carrying out my present invention I combine with the rollers and the ice-reservoir a means of returning to such reservoir the water after it may have escaped from the rollers, the same being in order that such water may be again cooled by the ice, and subsequently force through the rollers to again pass into the refrigerating-vessel.

I also employ with the refrigerating or water-cooling vessel a pump, and a conduit leading therefrom to the inner tubes or chambers of the rollers, and I use with such conduit a stop-cock, or such and a tank elevated above the rollers and the refrigerating or cooling vessel.

I also make the refrigerating-vessel with two compartments, opening into each other by a passage situated at or about the middle of their divisional partition.

In the drawing, C denotes the refrigerating or cooling vessel, it being divided across it by a partition, $h$, into two compartments, $e$ $f$, having a passage, $g$, of communication, arranged at or near the center of the partition, or below the level at which the water is to stand within the vessel. The first of these compartments is intended for the reception of the blocks or masses of ice used in cooling the water.

A pipe, D, extending down from a tub or vessel, E, situated beneath the educts of the rollers, opens into the ice-compartment.

Above the rollers, and, if desirable, over the refrigerating-cistern C, there may be a tank, F, into which the cooled water from the vessel C may be raised or forced by means of a pump, G, suitably applied to the said vessel and tank. A discharge-pipe, H, provided with a stop-cock, I, leads out of the tank and into a branch or head, $l$, opening into the two induction-pipes $d$ $d$ of the rollers A B, such rollers being geared together or provided with means of putting them in revolution, as occasion may require.

The tank affords a ready means of keeping the pump at work at times when it may be desirable to either wholly or partially intercept the flowage of the cool water through the rollers. It is also advantageous in other respects.

The refrigerating-cistern may be arranged above and the tank may be disposed below the rollers, a pump being employed in either case to raise the water from the lower to the higher of the two vessels. I prefer, however, to have the arrangement as represented in the drawing.

The purpose of making the refrigerating or cooling cistern with two compartments opening into each other, in manner as described, is to cause the straw and extraneous matters usually found on or in ice to be retained in the ice-compartment, so that such straw or extraneous matter or matters may not get into the pump or be forced into the rollers.

I claim—

1. In combination with the rollers, the refrigerating or cooling cistern and its means for supplying the cooled water thereof to the rollers, one or more pipes or conduits, or means of returning into the refrigerating vessel or cistern the spent cooled water after its exit from the rollers.

2. Also, the combination of the cooling-cistern, the receiving-tank, the pump, the rollers, and the conduits leading from the rollers to the said cistern and tank, the whole being substantially and to operate as and for the purpose as set forth.

3. Also, in combination with the rollers, the pump and conduits for conveying water to and into the rollers, and leading it therefrom to the cooling-cistern, such cistern, as made in two compartments, provided with a passage or means of communication, arranged as and for the purpose substantially as explained.

EBENEZER ROWE.

Witnesses:
R. H. EDDY,
J. R. SNOW.